United States Patent
Sankarakuthalam et al.

(10) Patent No.: US 12,406,313 B2
(45) Date of Patent: Sep. 2, 2025

(54) SYSTEM AND METHOD FOR TECHNOLOGY DEBT ASSESSMENT

(71) Applicant: Tata Consultancy Services Limited, Mumbai (IN)

(72) Inventors: Balasubramanian Sankarakuthalam, Chennai (IN); Abhik Chaudhuri, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 345 days.

(21) Appl. No.: 17/937,689

(22) Filed: Oct. 3, 2022

(65) Prior Publication Data

US 2023/0410213 A1   Dec. 21, 2023

(30) Foreign Application Priority Data

Jun. 8, 2022   (IN) .............. 202221032866

(51) Int. Cl.
*G06Q 40/12*   (2023.01)
*G06Q 10/0635*   (2023.01)

(52) U.S. Cl.
CPC ......... *G06Q 40/12* (2013.12); *G06Q 10/0635* (2013.01)

(58) Field of Classification Search
None
See application file for complete search history.

(56) References Cited

U.S. PATENT DOCUMENTS

| | | | |
|---|---|---|---|
| 8,027,894 B2* | 9/2011 | Feinstein | G06Q 40/02 705/30 |
| 2003/0093347 A1* | 5/2003 | Gray | G06Q 40/00 705/35 |

(Continued)

FOREIGN PATENT DOCUMENTS

CN   113313184 A   8/2021

OTHER PUBLICATIONS

Joachim Bjorklund et al. "A new approach for IT audit ?: Testing the theory of technology debt in an IT audit setting," Economics, Sep. 2016, Semantic Scholar, https://gupea.ub.gu.se/bitstream/handle/2077/35994/gupea_2077_35994_1.pdf;jsessionid=9031F92F1AAEE25E49624F8BF16EBFF6?sequence=1.

(Continued)

*Primary Examiner* — Fateh M Obaid
(74) *Attorney, Agent, or Firm* — Finnegan, Henderson, Farabow, Garrett & Dunner, LLP

(57) ABSTRACT

A widening gap between the emerging technology curve and technology adoption curve of businesses constitute the technology debt for an enterprise. Embodiments herein provide a method and system to identify technology debts and propose recommendations which may remediate the risk associated with technology debts. The system enables enterprises to take stock of their IT landscape across application and infrastructure that are running the risk of becoming obsolete. The system analyses various critical dimensions of an IT environment across various infrastructure and application components to arrive at the technology debts associated with each domain. The system provides a risk scoring mechanism that combines risk scoring parameters, past impact due to the identified technology debt, obsolescence component percentage in every technology area, security vulnerabilities present in the technology landscape, and critically of the application workload running on obsolescent (Continued)

technology component. The system makes recommendations to mitigate risk associated with identified technology debts.

11 Claims, 4 Drawing Sheets

(56) References Cited

U.S. PATENT DOCUMENTS

| | | | | |
|---|---|---|---|---|
| 2005/0234794 | A1* | 10/2005 | Melnicoff | G06Q 40/03 |
| | | | | 705/36 R |
| 2006/0248096 | A1* | 11/2006 | Adam | G06Q 40/00 |
| 2008/0295100 | A1* | 11/2008 | Ainsworth | G06Q 10/06 |
| | | | | 718/102 |
| 2014/0279694 | A1* | 9/2014 | Gauger | G06Q 40/06 |
| | | | | 705/36 R |
| 2017/0083672 | A1* | 3/2017 | Juneau | G06Q 50/22 |
| 2018/0204479 | A1* | 7/2018 | Kim | G09B 7/02 |
| 2019/0235923 | A1* | 8/2019 | Collins | G06F 9/5011 |
| 2020/0294128 | A1* | 9/2020 | Cella | H04L 9/3239 |
| 2021/0049003 | A1* | 2/2021 | Trahan | G06F 8/73 |
| 2021/0241367 | A1* | 8/2021 | Kim | G06Q 40/02 |
| 2021/0295426 | A1* | 9/2021 | Thiagarajan | G06Q 40/02 |
| 2021/0342836 | A1* | 11/2021 | Cella | H04L 9/3239 |
| 2021/0358032 | A1* | 11/2021 | Cella | G06F 16/2379 |
| 2022/0156676 | A1* | 5/2022 | Neuweg | G06Q 10/06393 |
| 2022/0198562 | A1* | 6/2022 | Cella | G06Q 40/04 |

OTHER PUBLICATIONS

Ariadi Nugroho, "An empirical model of technical debt and interest," Computer Science, Economics, 2021, Semantic Scholar, https://www.researchgate.net/publication/228684782_An_Empirical_Model_of_Technical_Debt_and_Interest/link/54dbc3550cf2a7769d92fd80/download.

* cited by examiner

SYSTEM AND METHOD FOR TECHNOLOGY DEBT ASSESSMENT

CROSS-REFERENCE TO RELATED APPLICATIONS AND PRIORITY

This U.S. patent application claims priority under 35 U.S.C. § 119 to Indian Application number 202221032866, filed on Jun. 8, 2022. The entire contents of the aforementioned application are incorporated herein by reference.

TECHNICAL FIELD

The disclosure herein generally relates to the field of technology debt assessment and more specifically, to a method and system for assessing technology landscape to identify technology debts and associated business risks.

BACKGROUND

With continuous improvements and advancements in technology and rise of digital, stacks of applications, infrastructure get outdated fast. As enterprises continue to run their operations on these fragmented and complex pieces of outdated stack at times with a number of custom codes, it becomes a bottleneck and creates a technology debt. The technology debt represents the quantum of digital technology in a business portfolio that requires continuous attention in terms of investment and people commitment but does not yield the desired business result.

The widening gap between an emerging technology curve and a technology adoption curve of businesses constitute the technology debt for an enterprise. Payoff of such technology debts frequently involve a significant cost to the enterprise. This significant cost sometimes raises the question of whether the investment to payoff is worth the expense and whether it may improve the maturity of the technology landscape for competitive edge, which often entails a consulting engagement by an outside organization to review the IT services, identify the technology debts and propose recommendations which may remediate the risk associated with technology debts.

SUMMARY

Embodiments of the disclosure present technological improvements as solutions to one or more of the above-mentioned technical problems recognized by the inventors in conventional systems. For example, in one embodiment, a method and system for assessing technology landscape to identify technology debts and corresponding associated business risks is provided.

In one aspect, a processor-implemented method for assessing technology landscape to identify technology debts and corresponding associated business risks is provided. The method includes one or more steps such as receiving one or more information from one or more layers of a plurality of technology resources, analyzing each of the plurality of technology resources to determine a current level of debt causing operational issues in a technology landscape and identifying an impact caused by the determined current level of debt of the plurality of technology resources to an enterprise service layer of the technology landscape. Further, a debt risk is calculated for each of the plurality of technology resources based on the identified impact of the plurality of technology resources and a risk score is generated for each of the plurality of technology resources that carry a technology debt due to the contributing factors that are not limited to architectural design decisions and obsolescent hardware and software. Finally, at least one solution is recommended based on the risk score of the technology debt associated with the plurality of technology resources to reduce the technology debt and mitigate the associated risk.

In another aspect, a system for assessing technology landscape to identify technology debts and corresponding associated business risks is provided. The system includes an input/output interface configured to receive one or more information from one or more layers of a plurality of technology resources of a technology landscape, one or more hardware processors and at least one memory storing a plurality of instructions, wherein the one or more hardware processors are configured to execute the plurality of instructions stored in at least one memory.

Further, the system is configured to analyze each of the plurality of technology resources to determine a current level of debt causing operational issues in a technology landscape and to identify an impact caused by the determined current level of debt of the plurality of technology resources to an enterprise service layer of the technology landscape. The risk arising from the technology debt is calculated for each of the plurality of technology resources based on the identified impact of the plurality of technology resources and a risk score is generated for each of the plurality of technology resources that carry a debt due to the contributing factors that are not limited to architectural design decisions and obsolescent hardware and software. Finally, at least one solution is recommended based on the risk score of the technology debt associated with the plurality of technology resources to reduce the technology debt and mitigate associated risk.

In yet another aspect, one or more non-transitory machine-readable information storage mediums are provided comprising one or more instructions, which when executed by one or more hardware processors causes a method for optimizing placement of data to at least one of a plurality of cloud datacenters complying data residency is provided. The method includes one or more steps such as receiving one or more information from one or more layers of a plurality of technology resources, analyzing each of the plurality of technology resources to determine a current level of debt causing operational issues in a technology landscape and identifying an impact caused by the determined current level of debt of the plurality of technology resources to an enterprise service layer of the technology landscape. Further, a debt risk is calculated for each of the plurality of technology resources based on the identified impact of the plurality of technology resources and a risk score is generated for each of the plurality of technology resources that carry a technology debt due to the contributing factors that are not limited to architectural design decisions and obsolescent hardware and software. Finally, at least one solution is recommended based on the risk score of the technology debt associated with the plurality of technology resources to reduce the technology debt and mitigate the associated risk.

It is to be understood that the foregoing general descriptions and the following detailed description are exemplary and explanatory only and are not restrictive of the invention, as claimed.

BRIEF DESCRIPTION OF THE DRAWINGS

The accompanying drawings, which are incorporated in and
constitute a part of this disclosure, illustrate exemplary embodiments and, together with the description, serve to explain the disclosed principles.

DETAILED DESCRIPTION OF EMBODIMENTS

Figure 1:
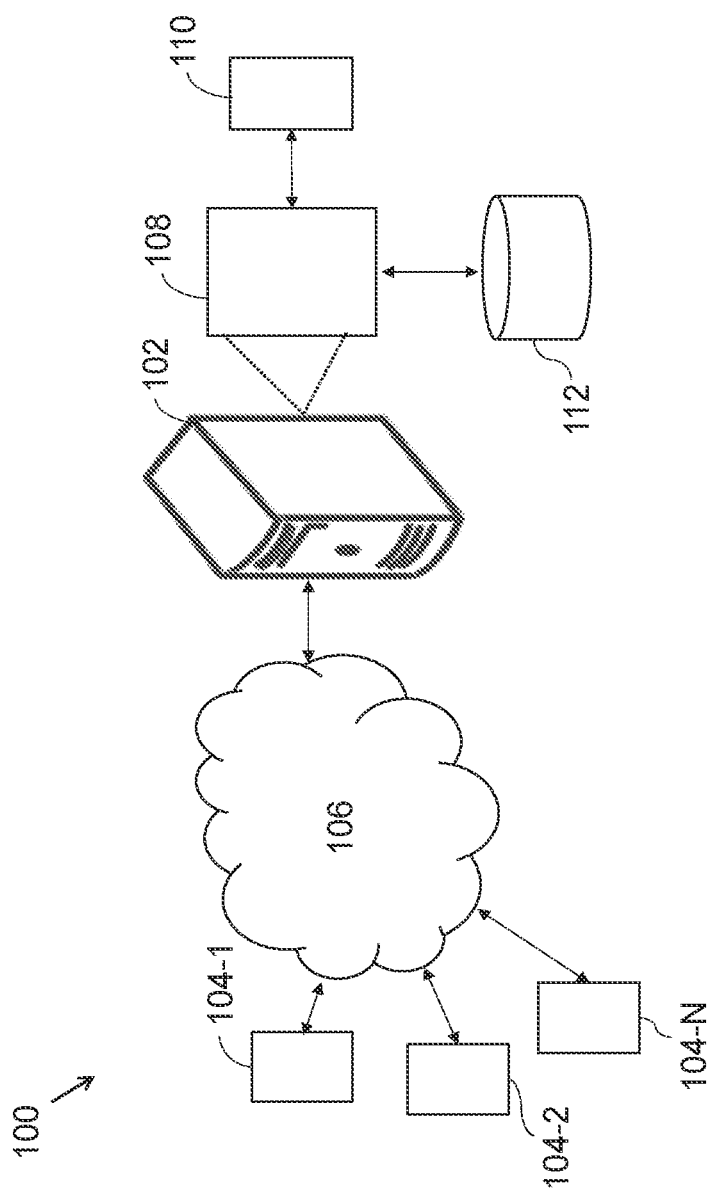
FIG. 1 illustrates a block diagram of an exemplary system for assessing technology landscape to identify technology debts, according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The embodiments herein provide a method and system for assessing technology landscape to identify technology debts. The method and system enable enterprises to take stock of their IT landscape across application and infrastructure that are running the risk of becoming obsolete from perspectives like lifespan, design and becoming a potential bottleneck for business agility. The present disclosure analyses seven critical dimensions (i.e. security, agility, reliability, resiliency, design, maintainability, and performance) of an IT environment across various infrastructure and application components to arrive at the technology debts associated with each domain.

Referring now to the drawings, and more particularly to FIG. 1 through 4, where similar reference characters denote corresponding features consistently throughout the figures, there are shown preferred embodiments and these embodiments are described in the context of the following exemplary system and/or method.

FIG. 1 illustrates a block diagram of a system (100) for assessing technology landscape to identify technology debts, in accordance with an example embodiment. Although the present disclosure is explained considering that the system (100) is implemented on a server, it may be understood that the system (100) may comprise one or more computing devices (102), such as a laptop computer, a desktop computer, a notebook, a workstation, a cloud-based computing environment and the like. It may be understood that the system (100) may be accessed through one or more input/output interfaces 104-1, 104-2 . . . 104-N, collectively referred to as I/O interface (104). Examples of the I/O interface (104) may include, but are not limited to, a user interface, a portable computer, a personal digital assistant, a handheld device, a smartphone, a tablet computer, a workstation, and the like. The I/O interface (104) are communicatively coupled to the system (100) through a network (106).

In an embodiment, the network (106) may be a wireless or a wired network, or a combination thereof. In an example, the network (106) can be implemented as a computer network, as one of the different types of networks, such as virtual private network (VPN), intranet, local area network (LAN), wide area network (WAN), the internet, and such. The network (106) may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network (106) may include a variety of network devices, including routers, bridges, servers, computing devices, storage devices. The network devices within the network (106) may interact with the system (100) through communication links.

The system (100) supports various connectivity options such as BLUETOOTH®, USB, ZigBee, and other cellular services. The network environment enables connection of various components of the system (100) using any communication link including Internet, WAN, MAN, and so on. In an exemplary embodiment, the system (100) is implemented to operate as a stand-alone device. In another embodiment, the system (100) may be implemented to work as a loosely coupled device to a smart computing environment. Further, the system (100) comprises at least one memory with a plurality of instructions, one or more databases (112), and one or more hardware processors (108) which are communicatively coupled with the at least one memory to execute a plurality of modules (114) therein. The components and functionalities of the system (100) are described further in detail.

Figure 2:
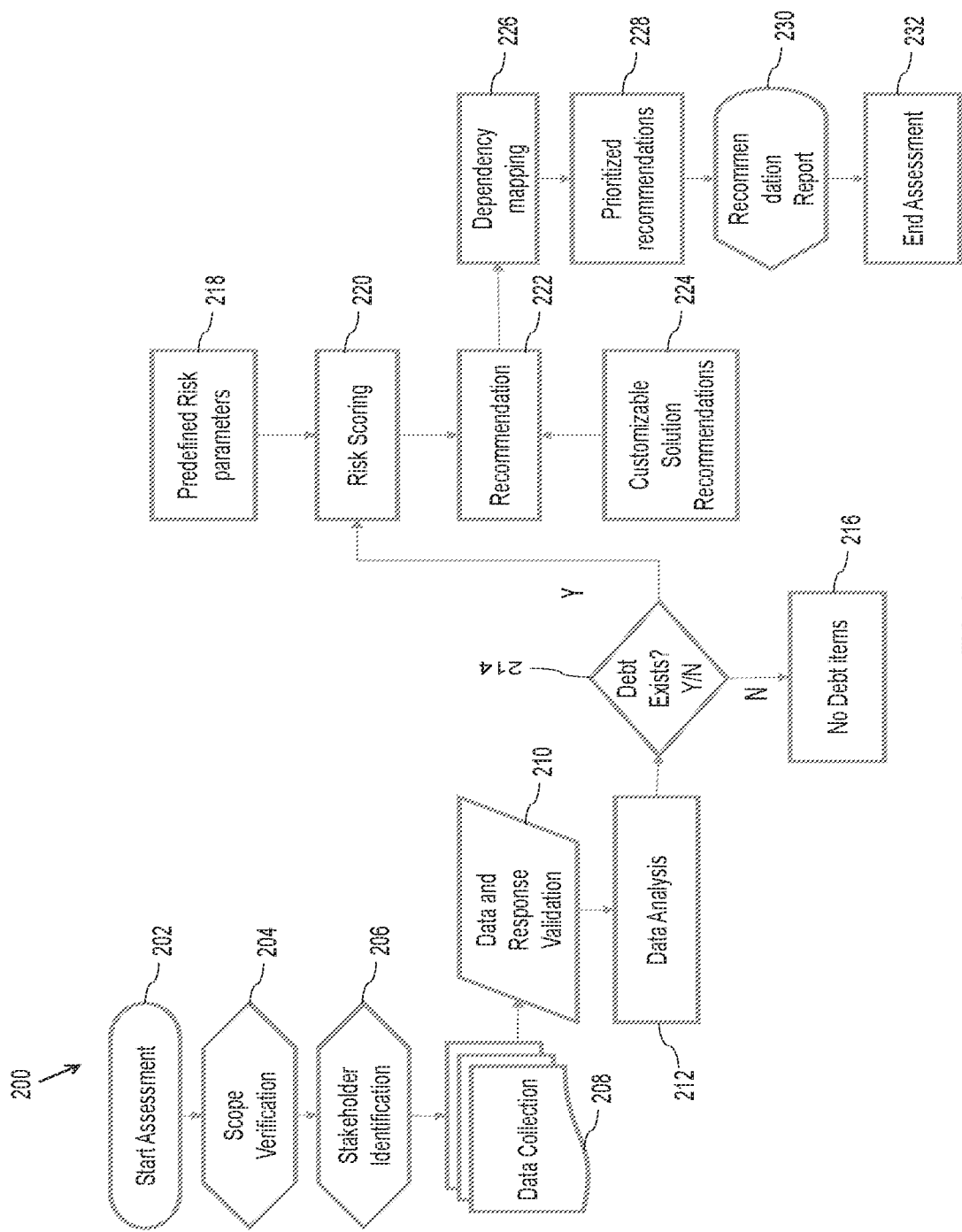
FIG. 2 is a functional flow diagram to illustrate technology landscape assessment, according to an embodiment of the present disclosure.

Referring FIG. 2, illustrates a functional flow diagram (200) of the system (100) for technology landscape assessment, according to an embodiment of the present disclosure. The system (100) is configured to identify technology debts and associated business risks to recommend at least one solution based a risk score of the technology debt associated with a plurality of technology resources to reduce the technology debt and mitigate the associated risk. It would be appreciated the system (100) is configured to deal with five contributing factors or debt loads (i.e., strategy & governance, design & architecture, system of relevance, security & compliance and process adherence) that can contribute toward the domain specific technology debt in existing state of IT operations of the business.

Herein, the one or more I/O interfaces (104) of the system (100) are configured to receive one or more information from one or more layers of a plurality of technology resources of a technology landscape. The technology resources such as network devices, databases, storage arrays, servers residing in a technology layers such as network, storage, database, and a computation platform. Further, the one or more information describing the make, model, configuration, and design of technology resources are collected by the system (100) and stored in the database of the system (100).

One or more information such as network devices that are outdated or not having the right firmware, unauthorized changes to security feature or policy configuration, high availability configuration, absence of monitoring solution, absence of backup replication, no disaster recovery plan, operating system incompatible database technologies, missing data encryption, servers running on legacy hardware in technology layers like network, storage, database and computation platform.

In one embodiment, the system (100) is configured to determine scope of assessment of the technology landscape. The assessment scope comprises of one or more technology resources that are involved in delivering the technology services and are chosen for the assessment. It is to be noted that the system (100) receives insights about the design and architecture of the technology resources from each technology layer from the subject matter experts (SMEs). Once the information about the technology resources are received, architecture understanding sessions may be held with the experts to validate the data received and their insights about the technology resources in the assessed entity.

In another embodiment, the system (100) is configured to analyze each of the plurality of technology resources to determine a current level of technology debt causing operational issues in the technology landscape. Herein, the system (100) analyzes seven critical dimensions (i.e. security, agility, reliability, resiliency, design, maintainability, and performance) of an IT environment across various infrastructure and application components (i.e. technology towers/domains) to arrive at the technology debts associated with each tower/domain. The technology areas that are found to be free from technology debts are marked by the system as no debt and are not considered for risk scoring.

In yet another embodiment, the system (100) is configured to identify an impact caused by the determined current level of the technology debt of the plurality of technology resources to an enterprise service layer of the technology landscape. The impact here refers to but not limited to unplanned business outages, delay in recovery of operations, failure to align IT operations to business objectives, cyber-attacks, data loss and performance issues.

Further, the system (100) identifies the potential impact of the technology debt in disrupting the stability of the operations. The likelihood of incident occurrence due to the nature of the technology debt and the level of impact due to past incident caused by the technology debt. The system (100) is configured to determine percentage of obsolescent hardware/software in the technology landscape and the criticality of the application workloads running on obsolescent components.

In one example, wherein network devices not having the right firmware are unstable and vulnerable to external attacks like DDOS, Ransomware and malware. Virtual servers running on clusters without high availability configured causes downtime for the virtual machines in the event of a host failure. The servers are not hardened as per the security guidelines and best practices are prone to get breached by security hacks. Storage growth not getting monitored leads to unnecessary files taking up costly storage space.

In yet another embodiment, the system (100) is configured to calculate a debt risk for each of the plurality of technology resources based on the identified impact of the plurality of technology resources. Herein, the system (100) with a risk scoring matrix based on predefined parameters and dimensions to identify technology debts that exist in various technology areas and assign a risk score to each of these debts that provides an indication of the level of risk caused by these debts to the organization. Technical debt loads causing the technology debts are assigned appropriate risk scoring weightage.

Figure 3:
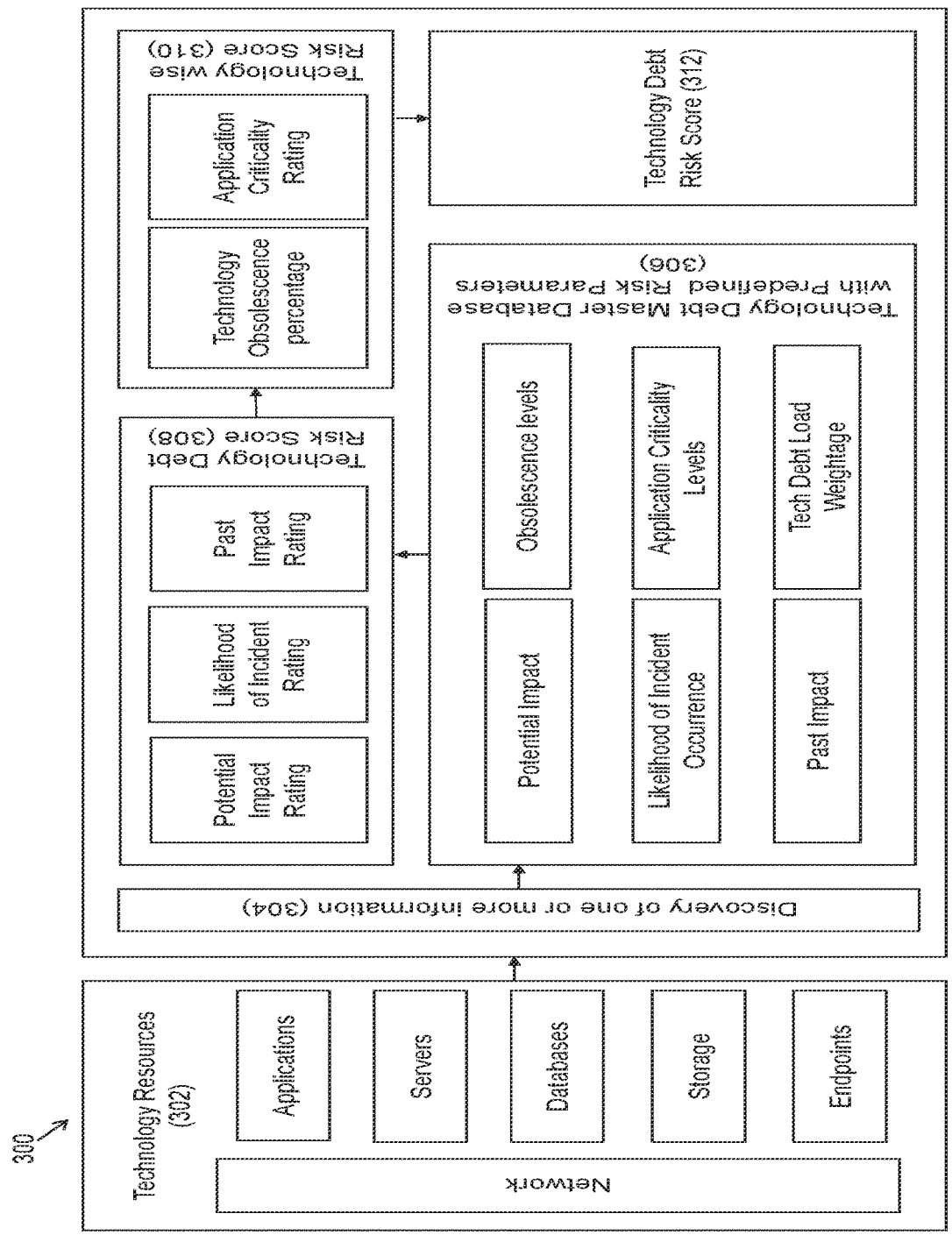
FIG. 3 is a functional block diagram to illustrate risk scoring methodology, according to an embodiment of the present disclosure.

Referring FIG. 3, a functional block diagram (300), illustrating a risk scoring methodology, according to an embodiment of the present disclosure. Herein, the technology debt risk scoring performed by the system (100) based on the applied risk scoring parameters. A potential impact rating may be assigned as per the mapped potential impact to the technology debt. Likelihood of incident occurrence rating may also be assigned as per the mapped likelihood. Past impact rating is assigned as per the mapped past impact to the technology debt. The information about obsolescence percentage of the technology layer is then considered for calculating the risk score of the technology layer. The critically of the application workload running on the obsolescent technology layer is then considered for calculating the risk score of the technology layer. After applying all the risk scoring parameters to the technology layers based on the identified technology debts, a final overall risk score may be generated for the technology layer and an appropriate risk zone may be assigned to that technology layer.

It would be appreciated that the technology resources that are bound to accumulate technology debts are at every technology layer of the assessed entity's technology landscape. This comprises of but not limited to applications, servers, network, database storage and endpoint devices.

In one illustration, wherein the system (100) provides a risk scoring mechanism that combines risk scoring parameters that are predefined for a technology debt, the input provided by the assesses on the level of past impact due to the identified technology debt, the obsolescence component percentage in every technology area, the security vulnerabilities present in the technology landscape, and the critically of the application workload running on the obsolescent technology component.

Further, the system (100) is configured to make recommendation to mitigate risk associated with the identified technology debts. A predefined recommendation is available in the system for each technology debt being screened which may be customized during assessment as per the technology debt scenario observed in the assessed technology layer. Recommended solution items have dependencies between them that gets mapped by the system to prioritize the recommendations. The recommendations are prioritized based on the impacts, changes, and investment requirements.

Figure 4:
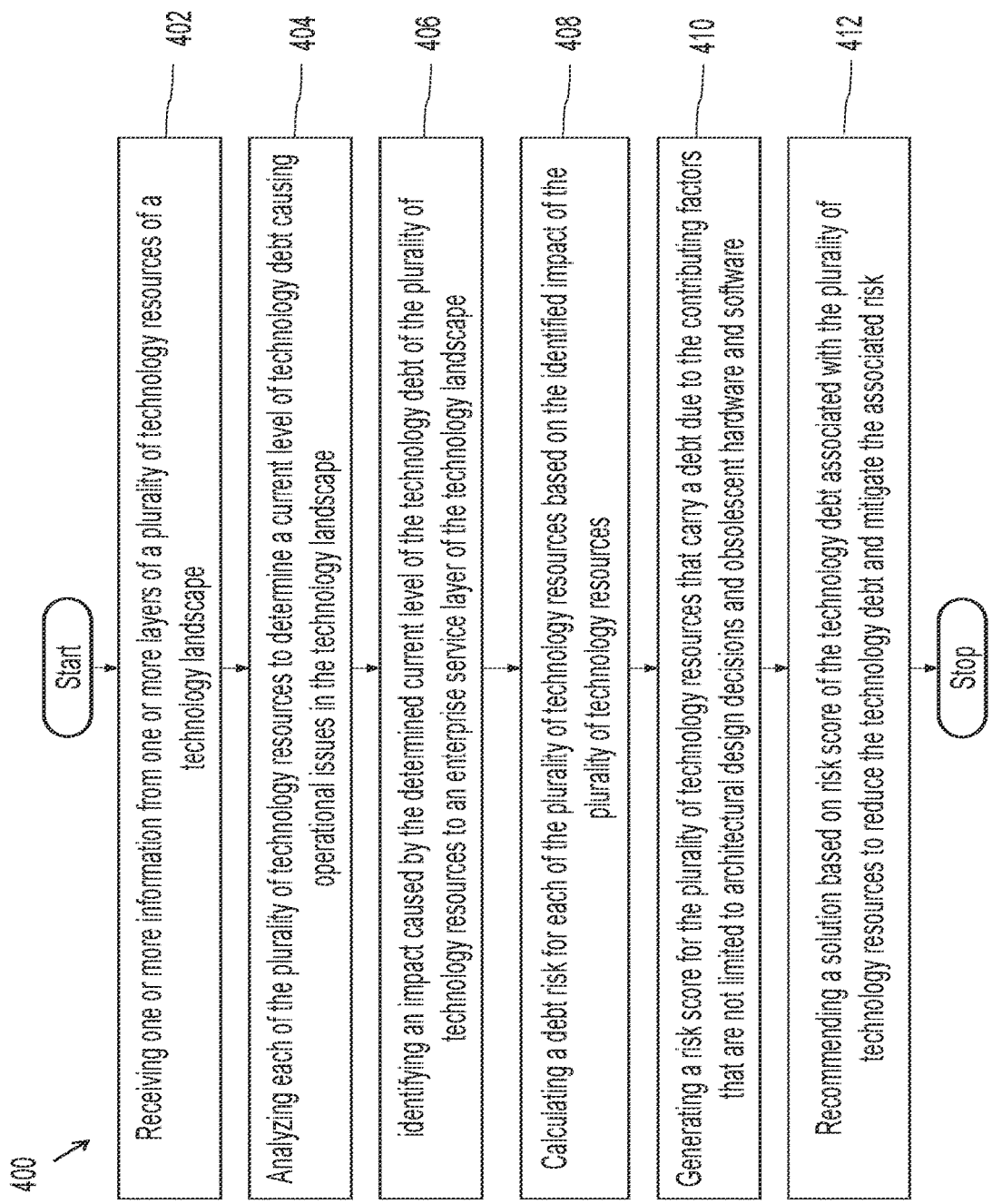
FIG. 4 is a flow diagram to illustrate a method for assessing technology landscape to identify technology debts, in accordance with some embodiments of the present disclosure.

Referring FIG. 4, to illustrate a processor-implemented method (400) for assessing technology landscape to identify technology debts is provided.

Initially, at the step (402), receiving one or more information from one or more layers of a plurality of technology resources of a technology landscape.

At the next step (404), analyzing each of the plurality of technology resources to determine a current level of technology debt causing operational issues in the technology landscape.

At the next step (406), identifying an impact caused by the determined current level of the technology debt of the plurality of technology resources to an enterprise service layer of the technology landscape.

At the next step (408), calculating a debt risk for each of the plurality of technology resources based on the identified impact of the plurality of technology resources.

At the next step (410), generating a risk score for the plurality of technology resources that carry the technology debt based on the identified impact, a likelihood of incident occurrence, and the calculated debt risk for the plurality of technology resources.

At the last step (412), recommending at least one solution based on the generated risk score that carry the technology debt to reduce the technology debt and mitigate the debt risk.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the problem related to assessment of technology debt. The widening gap between the emerging technology curve and technology adoption curve of businesses constitute the technology debt for an enterprise. Payoff of such technology debts frequently involve a significant cost to the enterprise. This significant cost sometimes raises the question of whether the investment to payoff is worth the expense and whether it may improve the maturity of the technology landscape for competitive edge, which often entails a consulting engagement by an outside organization to review the IT services, identify the technology debts and propose recommendations which may remediate the risk associated with technology debts. The embodiments herein provide a method and system for assessing technology landscape to identify technology debts. The method and system enable enterprises to take stock of their IT landscape across application and infrastructure that are running the risk of becoming obsolete from perspectives.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software modules located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development may change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) may be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method comprising steps of:
  receiving, via an input/output interface, one or more information from one or more layers of a plurality of technology resources of a technology landscape;
  analyzing, via one or more hardware processors, each of the plurality of technology resources to determine a current level of technology debt causing operational issues in the technology landscape, wherein the plurality of technology resources is analyzed based on all critical dimensions including a security, an agility, a reliability, a resiliency, a design, a maintainability, and a performance;
  identifying, via the one or more hardware processors, an impact caused by the determined current level of the technology debt of the plurality of technology resources to an enterprise service layer of the technology landscape;
  calculating, via the one or more hardware processors, a debt risk for each of the plurality of technology resources based on the identified impact of the plurality of technology resources;
  generating, via the one or more hardware processors, a risk score for the plurality of technology resources that carry the technology debt based on the identified impact, a likelihood of incident occurrence, and the calculated debt risk for the plurality of technology resources, wherein the step of generating the risk score comprising:

determining a potential impact rating based on an identified impact to the technology debt;
determining a likelihood of incident occurrence based on a mapped likelihood, wherein the likelihood of incident occurrence includes a nature of technology debt and a level of impact due to a past incident caused by the technology debt;
determining a past impact rating based on a mapped past impact to the technology debt;
determining a percentage of obsolescent hardware/software in the technology landscape and criticality of application workloads running obsolescent hardware/software components;
assigning the risk score to each of the technology debts provides an indication of the level of risk caused by the technology debts; and
recommending, via the one or more hardware processors, at least one solution based on the generated risk score that carry the technology debt to reduce the technology debt and mitigate the debt risk, wherein the recommendation is customized during assessment in accordance with technology debt.

2. The processor-implemented method of claim 1, wherein the technology debt comprises one or more debt loads.

3. The processor-implemented method of claim 2, wherein the one or more debt loads comprising a strategy, a governance, a design, an architecture, a security and compliance, and a process adherence.

4. The processor-implemented method of claim 1, wherein the plurality of technology resources is analyzed based on the critical dimensions of an information technology (IT) environment across an architecture and one or more technology domains.

5. The processor-implemented method of claim 1, wherein the impact caused by the determined current level of the technology debt comprising unplanned business outages, delay in recovery of operations, failure to align IT operations to business objectives, cyber-attacks, data loss and performance issues.

6. The processor-implemented method of claim 1, wherein generating the risk score further comprising:
calculating the debt risk of the technology layer based on an obsolescence percentage of the technology layer and an application workload running on the obsolescent technology layer; and
generating the risk score based the determined potential impact rating, the determined likelihood of incident occurrence, the determined past impact rating, and the calculated debt risk of the technology layer.

7. A system comprising:
an input/output interface to collect one or more information from one or more layers of a plurality of technology resources of a technology landscape;
a memory in communication with the one or more hardware processors, wherein the one or more hardware processors are configured to execute programmed instructions stored in the memory to:
analyze each of the plurality of technology resources to determine a current level of technology debt causing operational issues in the technology landscape, wherein the plurality of technology resources is analyzed based on all critical dimensions including a security, an agility, a reliability, a resiliency, a design, a maintainability, and a performance;
identify an impact caused by the determined current level of the technology debt of the plurality of technology resources to an enterprise service layer of the technology landscape;
calculate a debt risk for each of the plurality of technology resources based on the identified impact of the plurality of technology resources;
generate a risk score for the plurality of technology resources that carry the technology debt based on the identified impact, a likelihood of incident occurrence, and the calculated debt risk for the plurality of technology resources, wherein the risk score is generated by:
determining a potential impact rating based on an identified impact to the technology debt;
determining a likelihood of incident occurrence based on a mapped likelihood, wherein the likelihood of incident occurrence include a nature of technology debt and a level of impact due to a past incident caused by the technology debt;
determining a past impact rating based on the mapped past impact to the technology debt;
determining percentage of obsolescent hardware/software in the technology landscape and criticality of application workloads running obsolescent hardware/software components;
assign the risk score to each of the technology debts to provide an indication of the level of risk caused by the technology debts; and
recommend at least one solution based on the generated risk score of the technology debt to reduce the technology debt and mitigate the risk, wherein the recommendation is customized during assessment in accordance with technology debts.

8. The system of claim 7, wherein the one or more debt loads comprising a strategy, a governance, a design, an architecture, a security and compliance, and a process adherence.

9. The system of claim 7, wherein the plurality of technology resources is analyzed based on the critical dimensions of an information technology (IT) environment across an architecture and one or more technology domains.

10. The system of claim 7, wherein generating the risk score further comprising:
calculating the debt risk of the technology layer based on an obsolescence percentage of the technology layer and an application workload running on the obsolescent technology layer; and
generating the risk score based the determined potential impact rating, the determined likelihood of incident occurrence, the determined past impact rating, and the calculated debt risk of the technology layer.

11. A non-transitory computer readable medium storing one or more instructions which when executed by one or more processors on a system, cause the one or more processors to perform method comprising:
receiving, via an input/output interface, one or more information from one or more layers of a plurality of technology resources of a technology landscape;
analyzing, via one or more hardware processors, each of the plurality of technology resources to determine a current level of technology debt causing operational issues in the technology landscape, wherein the technology debt comprises one or more debt loads, wherein the plurality of technology resources is analyzed based on all critical dimensions including a security, an agility, a reliability, a resiliency, a design, a maintainability, and a performance;

identifying, via the one or more hardware processors, an impact caused by the determined current level of the technology debt of the plurality of technology resources to an enterprise service layer of the technology landscape;

calculating, via the one or more hardware processors, a debt risk for each of the plurality of technology resources based on the identified impact of the plurality of technology resources;

generating, via the one or more hardware processors, a risk score for the plurality of technology resources that carry the technology debt based on the identified impact, a likelihood of incident occurrence, and the calculated debt risk for the plurality of technology resources, wherein the step of generating the risk score comprising:

determining a potential impact rating based on an identified impact to the technology debt;

determining a likelihood of incident occurrence based on a mapped likelihood, wherein the likelihood of incident occurrence include a nature of technology debt and a level of impact due to a past incident caused by the technology debt;

determining a past impact rating based on the mapped past impact to the technology debt;

determining percentage of obsolescent hardware/software in the technology landscape and criticality of application workloads running obsolescent hardware/software components;

assign the risk score to each of the technology debts to provide an indication of the level of risk caused by the technology debts; and recommending, via the one or more hardware processors, at least one solution based on the generated risk score of the technology debt to reduce the technology debt and mitigate the debt risk, wherein the recommendation is customized during assessment in accordance with technology debts.

\* \* \* \* \*